Patented Sept. 28, 1943

2,330,376

UNITED STATES PATENT OFFICE 2,330,376

PREPARATION OF BIGUANIDE, GUANYL-UREA, AND THEIR SUBSTITUTION PRODUCTS

Robert P. Parker, Somerville, N. J., assignor to American Cyanamid Company, New York, N. Y., a corporation of Maine No Drawing. Application May 23, 1941, Serial No. 394,803

2 Claims. (Cl. 260—553)

This invention relates to the preparation of bases belonging to the group of biguanide and guanyl urea bases of the aliphatic series, and more particularly it relates to the preparation of these bases from their salts.

Biguanide, guanylurea and their lower alkyl derivatives are very hygroscopic compounds and are strong bases which have a tendency to combine with the carbon dioxide in the air. They are therefore stable only under certain precautions and hence are handled mostly in the form of their salts. Their aqueous solutions are unstable in that they are subject to hydrolytic decomposition.

The process of preparing the free bases from their salts such as the carbonate or sulfate, has been accomplished heretofore using an aqueous medium and employing an alkaline earth metal hydroxide. The insoluble earth metal salt is precipitated and the free base remains dissolved and is obtained upon evaporation of the aqueous solution. This and similar prior procedures, however, are extremely unsatisfactory because in the evaporation step part of the base is hydrolytically decomposed and it is difficult to dry the base obtained.

The bases dealt with, particularly biguanide, are starting materials for various syntheses, particularly for the preparation of guanamines and the purity of the starting material is of considerable importance in the syntheses.

According to the present invention it has been found that biguanide, guanylurea and their lower alkyl derivatives can be prepared from their salts by reacting these salts with the sodium or potassium compound of a lower aliphatic alcohol dissolved in a lower aliphatic alcohol. The acid radical of the biguanide or guanylurea salt combines with the alkali metal and the free organic base remains dissolved in the alcohol from which it may be recovered by concentration or evaporation. Not only are very high yields obtained, but the bases so prepared are extremely pure. A further advantage is that the bases so prepared are substantially anhydrous which materially lowers their tendency to decompose. It is a further advantage that alcoholic solutions containing the free bases remain stable over a considerable period of time if the free base is not used immediately.

The biguanide and guanyl urea bases which may be prepared according to the present invention comprise biguanide and guanylurea itself and their substitution products in which one or more hydrogen atoms are substituted by lower alkyl groups containing not more than four carbon atoms. Such substituted bases are e. g. 1-methyl biguanide, 1-ethyl biguanide, 1,2-dimethyl biguanide, 1,1,2-trimethyl biguanide, 1,1-diethyl biguanide, 1,5-dimethyl biguanide, 1,1,5,5-tetramethyl biguanide, 1-n-propyl biguanide, 1-n-butyl biguanide, 1-methyl guanylurea, 1-ethyl guanylurea etc. The numbering used is explained by the following formula:

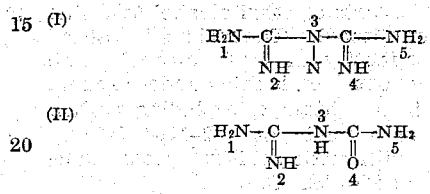

A very great variety of salts of these bases may be used. In the preferred embodiment of this invention we use biguanide and guanylurea salts of acids that form sodium or potassium salts insoluble in alcohol, because by doing so one may remove the insoluble alkali salt by filtration and recover the free biguanide or guanylurea base by evaporation. However, our invention is not restricted to the use of such salts because if the biguanide or guanylurea base is to be used in alcoholic solution it is obviously not necessary to remove the alkali salts. Obviously, the preferred salt will be the one in the form of which the biguanide or guanylurea is first isolated, and this will be in most cases the sulfate.

The sodium or potassium alcoholates used derive from a lower aliphatic alcohol having not more than four carbon atoms such as methyl alcohol, ethyl alcohol, propyl and butyl alcohols. In the preferred embodiment the alcohol used as solvent for the alcoholate is the same from which the alkali alcoholate derives and the solution used is prepared by dissolving the alkali metal in the corresponding alcohol. However, the invention is not restricted to this procedure and a solution of a separately prepared alkali alcoholate in a different alcohol, e. g. a solution of sodium methylate in ethyl alcohol, may be used as well.

The conditions under which the present process is carried out are not critical and reaction can be effected by simply stirring the reactants together in alcoholic solutions. However, a slightly elevated temperature is preferable because it accelerates the reaction. It does not make a difference whether the biguanide or guanylurea salt or the sodium alcoholate is added first to the solvent and whether the alkali metal is dissolved first in the alcohol and then the biguanide or guanylurea salt added or the latter salt added first to the alcohol and then the alkali metal dissolved therein.

The quantities of reactants used in the present process are not critical, but approximately equivalent proportions are preferred, particularly when the base is to be isolated as such.

The invention will be described in greater detail in conjunction with the following specific examples, but it should be understood that the invention is not limited to the particular conditions therein set forth or the quantities described. The parts in the examples are parts by weight.

Example 1

25.7 parts of sodium are dissolved in portions in 950 parts of ethyl alcohol in a system under reflux. The solution is stirred and cooled externally to 15–20° C. and 121 parts of finely ground biguanide sulfate are added. The reaction mixture is stirred for two hours at room temperature and then for one hour at 50–65° C. The alcoholic solution of biguanide base is filtered from the precipitated sodium sulfate and the alcoholic filtrate is evaporated under reduced pressure. The residue is biguanide.

For obtaining a base of high purity it may be ground under 35 parts of ethyl alcohol to a fine powder and then filtered. The residue is washed with a small quantity of fresh alcohol. The biguanide base so obtained is dried under vacuum and is stored in a container, excluding carbon dioxide. The base melts at 132–136° C. and forms a picrate with picric acid from water solution that melts at 230–232° C.

Example 2

In a system under reflux 23 parts of sodium are dissolved in 400 parts of methanol. To this solution are added with external cooling and with stirring 87 parts of biguanide dihydrochloride. The reaction is completed at 50°, the precipitated sodium chloride is filtered off and the methanol filtrate is evaporated under reduced pressure whereby the biguanide base is obtained.

Example 3

In a system under reflux 46 parts of sodium are dissolved in 1800 parts of ethyl alcohol and 400 parts of anhydrous guanylurea sulfate are added. The temperature is raised to 60° and stirring is maintained until the precipitation of sodium sulfate is complete. The precipitated sodium sulfate is filtered off and the alcoholic filtrate is evaporated under reduced pressure. The residue is guanylurea base.

While the invention has been described with specific reference to particular embodiments, it is to be understood that it is not to be limited thereto but is to be construed broadly and restricted solely by the scope of the appended claims.

I claim:

1. A method of preparing a free base of the group consisting of biguanide, guanylurea, and their substitution products, where the substituents are alkyl groups having not more than four carbon atoms, from their salts of inorganic acids taken from the group consisting of hydrogen sulfate and hydrogen chloride, which comprises reacting said salts in approximately equivalent proportions with compounds of the group consisting of sodium and potassium alcoholates of aliphatic alcohols having not more than four carbon atoms in a solvent medium consisting of an aliphatic alcohol having not more than four carbon atoms.

2. A method of preparing a free base of the group consisting of biguanide, guanylurea, and their substitution products, where the substituents are alkyl groups having not more than four carbon atoms, from their salts of inorganic acids taken from the group consisting of hydrogen sulfate and hydrogen chloride, which comprises reacting said salts in approximately equivalent proportions with compounds of the group consisting of sodium and potassium alcoholates of aliphatic alcohols having not more than four carbon atoms in a solvent medium consisting of an aliphatic alcohol having not more than four carbon atoms, filtering off the thus-formed insoluble alkali metal salt, and isolating the free base from the filtrate by evaporation.

ROBERT P. PARKER.

Certificate of Correction

Patent No. 2,330,376. September 28, 1943.

ROBERT P. PARKER

It is hereby certified that error appears in the printed specification of the above numbered patent requiring correction as follows: Page 1, second column, lines 15–16, for that portion of the formula reading $$``\begin{array}{c}3\\-\text{N}-\\|\\\text{N}\end{array}"\quad\text{read}\quad\begin{array}{c}3\\-\text{N}-\\|\\\text{H}\end{array}.$$

and that the said Letters Patent should be read with this correction therein that the same may conform to the record of the case in the Patent Office.

Signed and sealed this 30th day of November, A. D. 1943.

[SEAL]

HENRY VAN ARSDALE,
*Acting Commissioner of Patents.*